United States Patent
Hardy et al.

(10) Patent No.: US 10,209,715 B2
(45) Date of Patent: Feb. 19, 2019

(54) SYSTEM AND METHOD OF USING CROWD-SOURCED DRIVING PATH DATA IN AN AUTONOMOUS OR SEMI-AUTONOMOUS DRIVING SYSTEM

(71) Applicant: Robert Bosch GmbH, Stuttgart (DE)

(72) Inventors: Jason Scott Hardy, Union City, CA (US); Thomas Glaser, Menlo Park, CA (US); Joerg Mueller, Mountain View, CA (US); Mithun Jacob, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 15/409,953

(22) Filed: Jan. 19, 2017

(65) Prior Publication Data

US 2018/0203453 A1    Jul. 19, 2018

(51) Int. Cl.
| | | |
|---|---|---|
| G05D 1/02 | (2006.01) | |
| G08G 1/0967 | (2006.01) | |
| G08G 1/01 | (2006.01) | |
| G08G 1/16 | (2006.01) | |

(52) U.S. Cl.
CPC ......... G05D 1/0214 (2013.01); G08G 1/0112 (2013.01); G08G 1/096725 (2013.01); G08G 1/096791 (2013.01); G08G 1/167 (2013.01); G05D 2201/0213 (2013.01)

(58) Field of Classification Search
CPC ........... G05D 1/0214; G08G 1/096725; G08G 1/096791
See application file for complete search history.

(56) References Cited

U.S. PATENT DOCUMENTS

| | | | |
|---|---|---|---|
| 9,045,041 B2 | 6/2015 | Dorum et al. | |
| 9,240,082 B2 | 1/2016 | Marathe et al. | |
| 9,340,207 B2 | 5/2016 | Nagasaka et al. | |
| 2013/0131908 A1 | 5/2013 | Trepagnier et al. | |
| 2014/0379171 A1 | 12/2014 | Kim et al. | |
| 2015/0266455 A1 | 9/2015 | Wilson | |
| 2017/0010106 A1* | 1/2017 | Shashua | G01C 21/32 |

FOREIGN PATENT DOCUMENTS

GB    2520612    5/2015

OTHER PUBLICATIONS

International Search Report, dated May 3, 2018, corresponding to PCT International Application No. PCT/EP2018/051189, 5 pages.

* cited by examiner

*Primary Examiner* — Basil T. Jos
(74) *Attorney, Agent, or Firm* — Kathy K. Takeguchi; Maginot Moore & Beck LLP

(57) ABSTRACT

A processing system includes at least one computer processor, which is configured to implement a method that includes receiving crowd-sourced driving path data, map data, and real-time sensor data associated with a roadway. The method includes generating, by the processing system, optimized driving path data for the roadway based on the crowd-sourced path data, the map data, and the sensor data. The method includes providing control signals to control an autonomous or semi-autonomous vehicle based on the optimized driving path data.

18 Claims, 10 Drawing Sheets

… (1) …

SYSTEM AND METHOD OF USING CROWD-SOURCED DRIVING PATH DATA IN AN AUTONOMOUS OR SEMI-AUTONOMOUS DRIVING SYSTEM

FIELD OF THE INVENTION

This disclosure relates generally to an autonomous or semi-autonomous driving system, and more specifically to providing optimized driving path data to the autonomous or semi-autonomous driving system of a vehicle.

BACKGROUND

Motion control systems for autonomous or semi-autonomous driving systems typically rely on representations of the driving areas. Generally, these representations are based on reference paths, which include prerecorded centerlines and/or lane structure data. For example, these prerecorded centerlines can be taken from various map data, such as Route Network Definition File, OpenStreetMap, or other sources. However, there are many instances in which the prerecorded centerlines and/or lane structure alone do not provide sufficient information for the autonomous or semi-autonomous driving systems to safely handle certain driving areas.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a method includes receiving, by a processing system with at least one computer processor, crowd-sourced driving path data, map data, and sensor data of a roadway. The method includes generating optimized driving path data for the roadway based on the crowd-sourced driving path data, the map data, and the sensor data. The method includes providing control signals to drive an autonomous or semi-autonomous vehicle based at least on the optimized driving path data.

In an example embodiment, a processing system includes at least one processor. The processing system is configured to implement a method that includes receiving crowd-sourced driving path data, map data, and sensor data of a roadway. The method includes generating optimized driving path data for the roadway based on the crowd-sourced driving path data, the map data, and the sensor data. The method includes providing control signals to drive an autonomous or semi-autonomous vehicle based at least on the optimized driving path data.

In an example embodiment, an autonomous or semi-autonomous vehicle includes a processing system with at least one computer processor. The processing system is configured to implement a method that includes receiving crowd-sourced driving path data, map data, and sensor data of the roadway. The processing system is configured to generate optimized driving path data for the roadway based on the crowd-sourced driving path data, the map data, and the sensor data. The processing system is configured to provide control signals to drive an autonomous or semi-autonomous vehicle based at least on the optimized driving path data.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
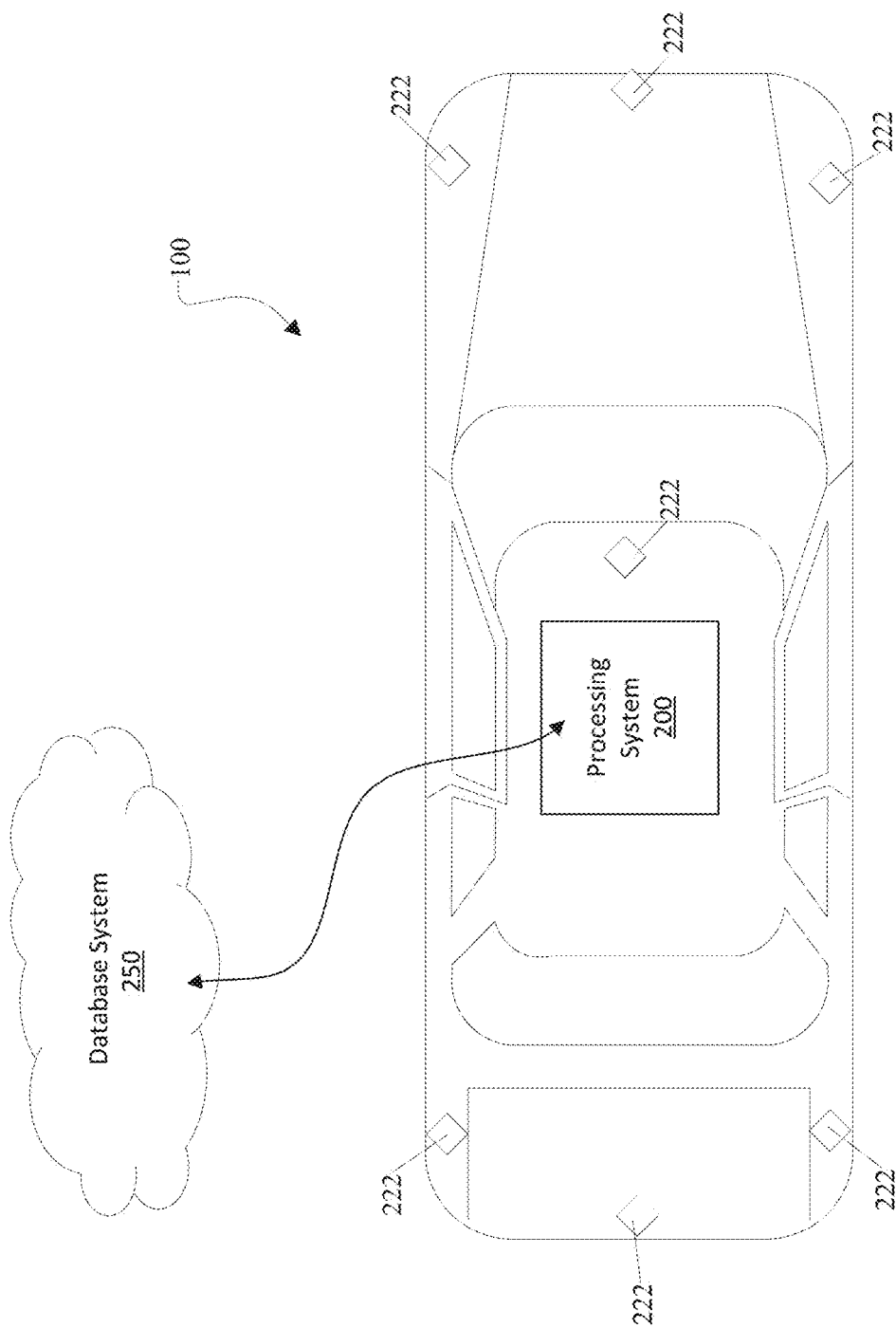
FIG. 1 is a diagram of an autonomous or a semi-autonomous vehicle according to an example embodiment of this disclosure.

FIG. 1 is diagram of a vehicle 100 according to an example embodiment. In an example embodiment, the vehicle 100 is configured to drive autonomously or semi-autonomously. For example, in FIG. 1, the vehicle 100 is a mobile machine, which is configured to be driven autonomously or semi-autonomously in accordance with optimized driving path data 104. In an example embodiment, the vehicle 100 includes at least a processing system 200 with any combination of suitable hardware and/or software technology, which enables the vehicle 100 to be driven autonomously or semi-autonomously through an environment without human interaction during the driving process.

In an example embodiment, the vehicle 100 includes one or more sensors 222. In an example embodiment, the one or more sensors 222 are configured to capture data relevant to the current driving conditions, the performance of the vehicle 100, the driving environment of the vehicle 100, the navigation of the vehicle 100, other relevant driving information, or any combination thereof. In an example embodiment, upon capturing the data, the one or more sensors 222 are configured to provide the captured data to the appropriate sensor system for processing. For instance, in FIG. 1, the vehicle 100 includes a plurality of sensors 222, which are configured to be processed by the appropriate sensor system. In this regard, for example, the vehicle 100 can include a camera system, a light detection and ranging (LIDAR) system, an image-based system, an odometer system, a radar system, a satellite navigation system (e.g., global positioning system (GPS), Galileo, or another satellite system), a sonar system, a lane-keeping assist (LKA) system, a simultaneous localization and mapping (SLAM) system, a visual-SLAM (vSLAM), an inertial measurement unit (IMU), an adaptive cruise control (ACC) system, an ultrasonic sensor system, any suitable sensor system, or any combination thereof Turning to FIG. 1, as an example, the vehicle 100 includes at least one sensor that is able to capture data, which is processed by a LIDAR system and which is configured to provide information relating to lane markings, lane boundaries, roadway edges, road structures, or any combination thereof. In this example, the vehicle 100 includes at least one sensor that is able to capture data, which is processed by a radar system and which is configured to provide information, for example, relating to nearby vehicles, obstacles, and/or other relevant data. Also, in FIG. 1, the vehicle 100 includes at least one camera that is able to capture data, which is processed by an imaging system and which is configured to provide information relating to vehicles, lane lines, traffic lights, pedestrians, obstacles, road signs, and other relevant information. Additionally or alternatively, the vehicle 100, as shown in FIG. 1, is configured to include other sensors 222 along with their corresponding sensor systems.

Figure 2:
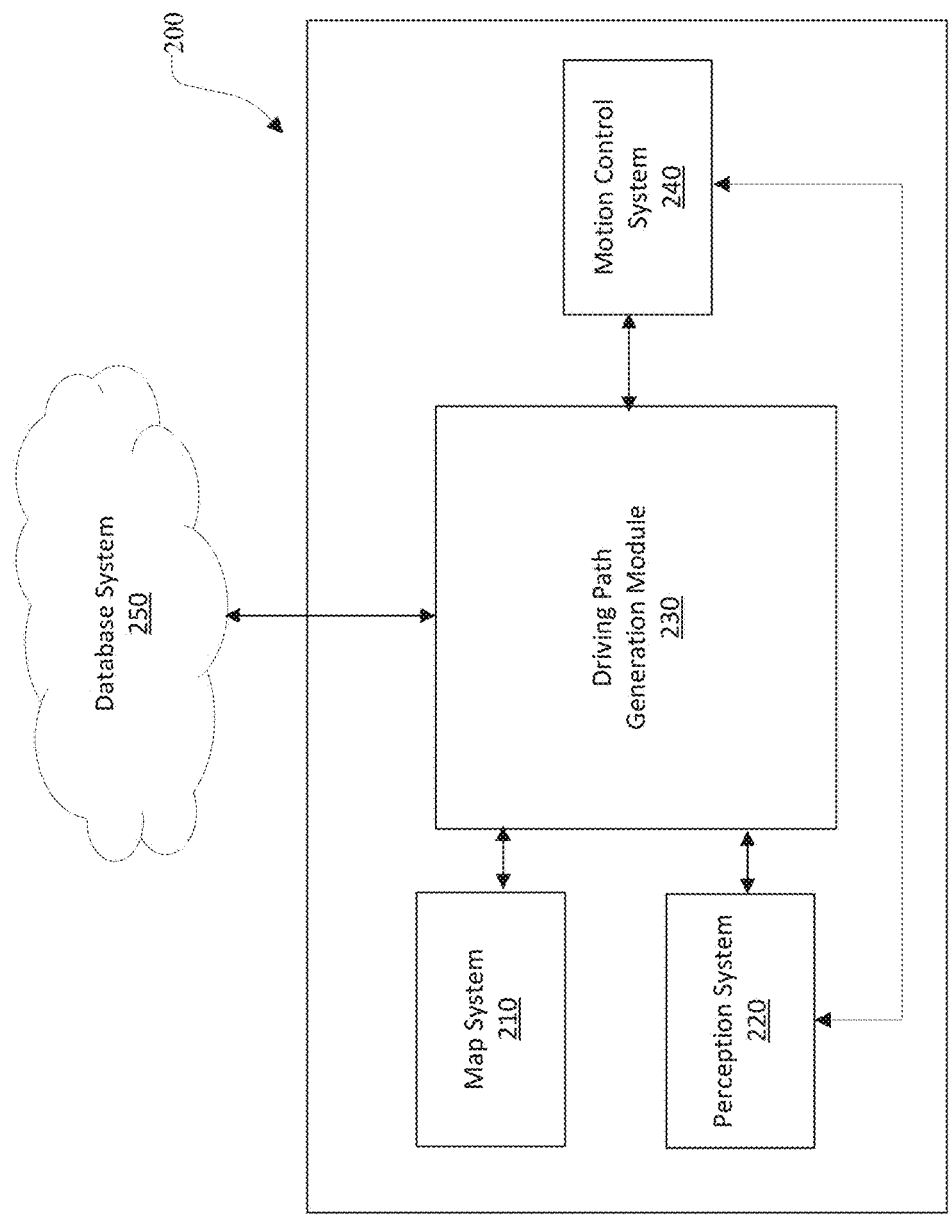
FIG. 2 is a diagram of the processing system of FIG. 1 according to an example embodiment of this disclosure.

In an example embodiment, the vehicle 100 includes processing system 200. In an example embodiment, the processing system 200 is configured to generate optimized driving path data 104 for the vehicle 100. In this regard, the processing system 200 is configured to take into account various factors when generating the optimized driving path data 104. For example, the processing system 200 is configured to determine the optimized driving path data 104 based at least on crowd-sourced driving path data 102, sensor data, map data, or any combination thereof. In this regard, for example, the vehicle 100 includes communication and/or network technology, which enables at least each of the components, as shown in FIG. 2, to communicate with each other in the appropriate manner. In an example embodiment, for instance, the vehicle 100 includes control area network (CAN) buses, Ethernet, wireless communication technology, and any suitable communication and/or networking technology.

FIG. 2 is a diagram of the processing system 200 according to an example embodiment. In an example embodiment, the processing system 200 includes any suitable combination of hardware and/or software technology that enables the vehicle 100 to drive autonomously or semi-autonomously in accordance with the optimized driving path data 104. In an example embodiment, the processing system 200 includes at least a map system 210, a perception system 220, a driving path generation module 230, and a motion control system 240, as well as a secure connection to a cloud-based computing system, such as database system 250.

In an example embodiment, the processing system 200 includes a map system 210. In an example embodiment, the map system 210 includes electronic and/or digital map data. In an example embodiment, the map data includes detailed roadway information. For instance, in an example embodiment, the map data includes road geometry information, road structure information, lane geometry information, lane position information, lane width information, lane-change information, center-line information, and other relevant data for autonomous or semi-autonomous driving. Additionally, in an example embodiment, the map system 210 includes information, which is provided by GPS technology. In an example embodiment, the map data is stored as a part of the map system 210 in a computer readable memory, which is accessible by the driving path generation module 230 upon request.

In an example embodiment, the processing system 200 includes a perception system 220. In an example embodiment, the perception system 220 provides real-time sensor data to the driving path generation module 230 such that the optimized driving path data 104 takes into account information acquired from sensors 222 associated with the vehicle 100. In addition, the perception system 220 is configured to provide real-time data to the motion control system 240 such that the vehicle 100 is enabled to adapt in a dynamic manner to the current driving situation. To do so, the perception system 220 includes one or more sensors 222 along with its corresponding sensor system, as discussed above with regard to FIG. 1.

In an example embodiment, the processing system 200 includes a driving path generation module 230. In an example embodiment, the driving path generation module 230 is configured to manage any input data received from the map system 210, the perception system 220, the database system 250, or any combination thereof In this regard, for example, the driving path generation module 230 is configured to perform numerical calculations and/or mathematical optimization techniques, such as Interior Point methods, Sequential Quadratic Programming, and/or other suitable algorithms, to generate optimized driving path data 104. In an example embodiment, the driving path generation module 230 is configured to generate the optimized driving path data 104, which includes driving position data that is optimized to at least (i) stay close to driving positions of the crowd-sourced driving path data 102, (ii) keep away from the boundaries of the driving corridor 1010, and/or (iii) minimize curvature along its length (e.g., minimize curvature along a projected driving path) while obeying turn radius constraints of the vehicle 100.

In an example embodiment, the processing system 200 includes the motion control system 240. In an example embodiment, the motion control system 240 includes a platform with hardware and/or software technology that is configured to provide control signals to drive the vehicle 100. In an example embodiment, the motion control system 240 is configured to receive the driving corridor 1010, the optimized driving path data 104, or any combination thereof from the driving path generation module 230. In an example embodiment, the motion control system 240 is configured to control the vehicle 100 based on a smooth version of the optimized driving path data 104. In this regard, for example, the smooth version of the optimized driving path data 104 provides the vehicle 100 with a drive that includes relatively smooth steering, acceleration, braking, and the like. In an example embodiment, the motion control system 240 is configured to position the vehicle 100 within the driving corridor 1010, thereby conforming the vehicle 100 to lane boundaries and drivable areas. In an example embodiment, the motion control system 240 is configured to follow the smooth version of the optimized driving path data 104 while adapting the time-varying trajectory of the vehicle 100 to the dynamic traffic situation around the vehicle 100.

In an example embodiment, the processing system 200 is in communication with database system 250. In this regard, for example, the processing system 200 is configured to receive crowd-sourced driving path data 104 regarding the roadways. With the crowd-sourced driving path data 104, the processing system 200 is configured to direct the vehicle 100 on the roadways based on human-driving behaviors and patterns. In this regard, for example, the processing system 200 is able to direct the vehicle 100 based on past human-driving behaviors and experiences via the crowd-sourced driving path data 104 even in instances when the map system 210 and/or the perception system 220 is not available to provide data to the driving path generation module 230.

Figure 3:
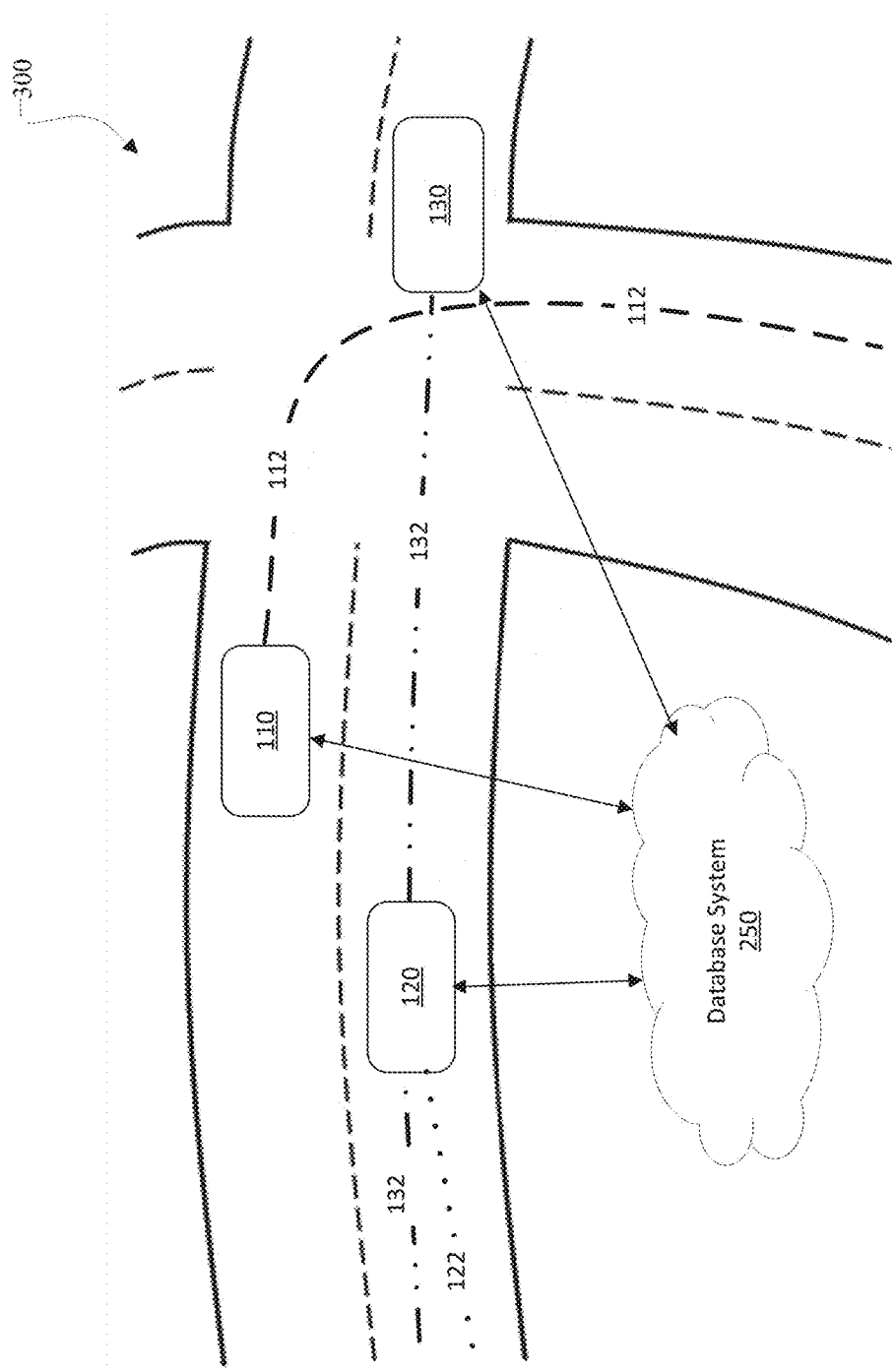
FIG. 3 is a diagram of the database system of FIG. 1 according to an example embodiment of this disclosure.

FIG. 3 is a conceptual diagram of the database system 250 of FIG. 1. In an example embodiment, the database system 250 is configured to connect to a plurality of human-driven vehicles of a suitable sample size for analysis. In an example embodiment, the database system 250 is connected to each of the plurality of human-driven vehicles by any suitable communication technology and/or network technology. For example, in FIG. 3, the database system 250 is in communication with a plurality of vehicles including at least human-driven vehicle 110, human-driven vehicle 120, and human-driven vehicle 130, as well as a large number of other human-driven vehicles that are not illustrated in this diagram.

In an example embodiment, each of the plurality of human-driven vehicles is configured to generate at least one driving log that includes at least driving position data, which is collected by that human-driven vehicle. For instance, in FIG. 3, the human-driven vehicle 110 is configured to generate at least one driving log that includes driving position data corresponding to its driving path 112 at and/or near an intersection 300. Also, as shown in FIG. 3, the human-driven vehicle 120 is configured to generate at least one driving log that includes driving position data corresponding to its driving path 122 at and/or near an intersection 300. In addition, as another example, the human-driven vehicle 130 is configured to generate at least one driving log that includes driving position data corresponding to its driving path 132 at and/or near an intersection 300. In this regard, each of the plurality of human-driven vehicles is enabled to transmit a respective driving log to the database system 250.

In an example embodiment, the database system 250 is configured to receive a driving log from each of the plurality of human-driven vehicles. For instance, each driving log may be transmitted via an appropriate communication technology and/or network technology to the database system 250. For example, FIG. 3 illustrates an example in which each of the driving logs of each of the human-driven vehicles 110, 120, and 130 are transmitted wirelessly to the database system 250.

In an example embodiment, the database system 250 includes any suitable architecture, e.g. a centralized, decentralized, hierarchical, or the like. For example, in FIG. 3, the database system 250 is a centralized database system, which is remote from the processing system 200. In an example embodiment, upon being collected by the database system 250, the data of the driving logs are combined using at least one of the various forms of data fusion techniques, e.g. SLAM, Kalman Filtering, trajectory clustering, and/or other appropriate algorithms. In an example embodiment, the database system 250 is configured to generate crowd-sourced driving path data 102 for each possible route in the road network. In an example embodiment, the crowd-sourced driving path data 102 is transmitted to the vehicle 100 via any suitable communication and/or network technology.

Figure 4:
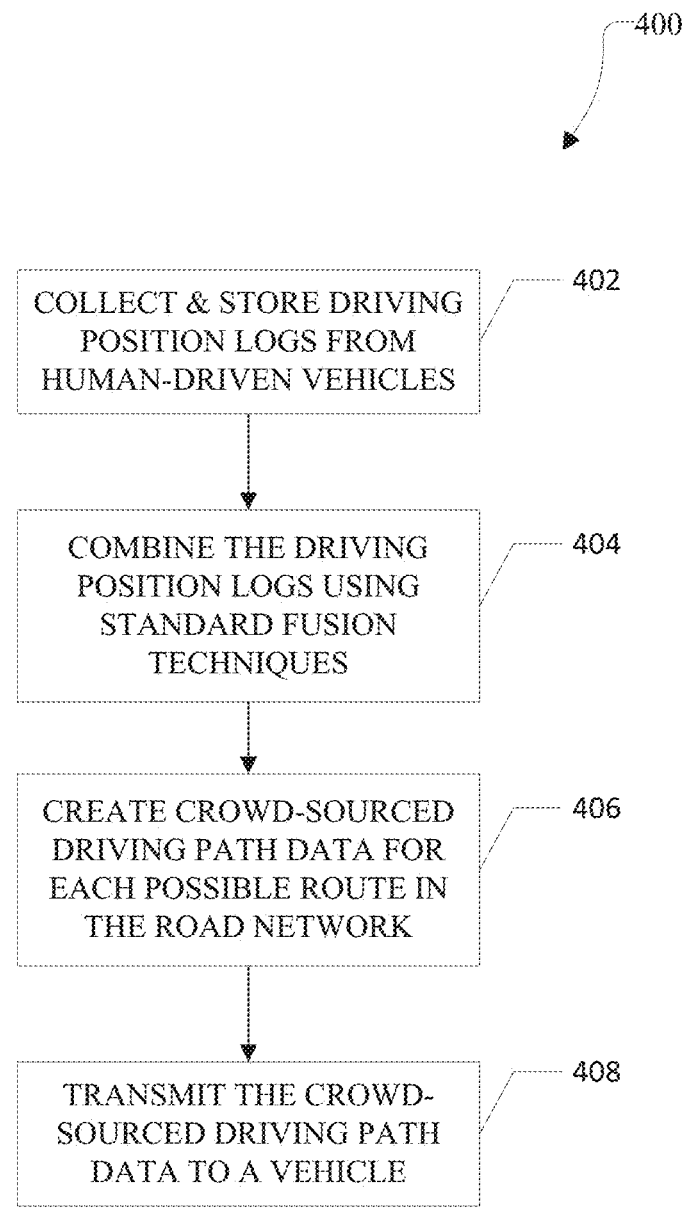
FIG. 4 is a flowchart that illustrates a method performed by the database system according to an example embodiment of this disclosure.

FIG. 4 is a flowchart that illustrates a method 400 performed by the database system 250 according to an example embodiment. More specifically, at step 402, the database system 250 is configured to collect the driving logs from a plurality of human-driven vehicles and store these driving logs in computer readable memory of the database system 250. In an example embodiment, the driving logs include at least driving position data of human-driven vehicles. In an example embodiment, the driving logs are transmitted via wireless communication technology from the human-driven vehicles to the database system 250 (FIG. 3).

At step 404, the database system 250 is configured to combine the data of the driving logs. As mentioned above, the database system 250 is configured to receive each of the driving logs from each of the plurality of human-driven vehicles. In an example embodiment, once received, the database system 250 is configured to combine the information (e.g., driving position data) provided by the driving logs. In an example embodiment, the data of the driving logs are combined to form a mathematical model of the crowd-sourced driving path data 102, which is able to be adjusted when combined with other driving logs, if necessary. In an example embodiment, the data of the driving logs are combined via standard data fusion techniques, such as SLAM, Kalman Filtering, and/or other techniques. In this regard, for example, the database system 250 is configured to optimally combine driving position data and/or multiple trajectories of the human-driven vehicles during the process of mapping out the driving area.

At step 406, upon combining the information from the driving logs, the database system 250 is configured to generate the crowd-sourced driving path data 102 for each possible route, roadway, and/or driving area in the network. In this regard, for example, the crowd sourced driving path data 102 is particularly beneficial in providing the vehicle 100 with information relating to actual human-driven paths taken in that driving area. With the crowd-sourced driving path data 102, the vehicle 100 is configured to utilize knowledge and assessments of the driving area that have been made by human drivers, thereby improving the driving experience (e.g., comfort, safety, and the like) of the vehicle 100. Also, the crowd-sourced driving path data 102 enables the vehicle 100 to implicitly account for location specific knowledge, as obtained via a large number of human-driven vehicles.

At step 408, the database system 250 transmits the crowd-sourced driving path data 102 to the vehicle 100. In an example embodiment, the crowd-sourced driving path data 102 is transmitted to the vehicle 100 upon being requested by the processing system 200. The crowd-sourced driving path data 102 includes historical human driving information regarding the roadways. When received by the vehicle 100, this information enables the processing system 200 to control the vehicle 100 in accordance with local driving norms and customs. In this regard, for example, the crowd-sourced driving path data 102 is configured to provide the vehicle 100 with a more human-like and/or socially acceptable approach to driving on the roadway.

In addition, the crowd-sourced driving path data 102 provides the vehicle 100 with information relating to the roadway's general lane structure, which is particularly useful in the event that other information, such as road markings, physical boundaries, and/or sensor data, are not available for a particular segment of the roadway and/or not available at a particular point in time. Also, with the crowd-sourced driving path data 102, the vehicle 100 is able to be controlled in a manner that minimizes risks in dangerous situations, which may not be apparent to the motion control system 240. Advantageously, the vehicle 100 is controlled in accordance with at least (a) information pertaining to the driving area itself via the map data, (b) information pertaining to the current driving situation of the driving area via the onboard sensors 222, and/or (c) information pertaining to human-driven paths of the driving area via crowd-sourced driving path data 102, thereby improving the navigation and performance of the motion control system 240.

Figure 5:
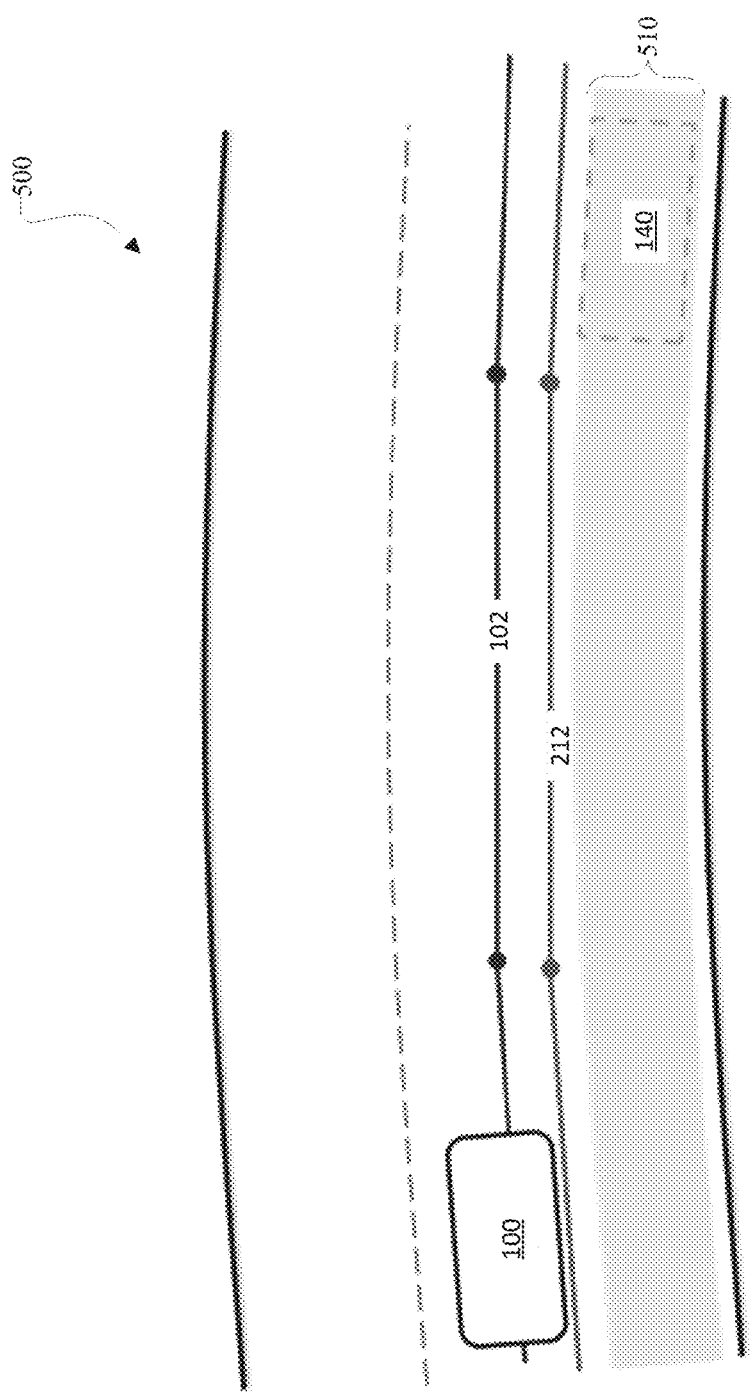
FIG. 5 is a diagram that illustrates an example of the crowd-sourced driving path data according to an example embodiment of this disclosure.

FIG. 5 is a diagram that illustrates an example of the crowd-sourced driving path data 102 according to an example embodiment. As shown, FIG. 5 illustrates a segment of the roadway 500 along with a centerline 212, which is associated with the right lane. In this example, the right side of the right lane is typically used as a parking area 510, as indicated in FIG. 5. Also, in this particular instance, the right side of the right lane includes at least one parked vehicle 140. For this segment of the roadway 500, however, the use of the right side of the right lane as a parking area 510 is not indicated by the map data of the map system 210 and not detectable by the sensors 222 of the perception system 220. Nevertheless, as shown in FIG. 5, the crowd-sourced driving path data 102 is able to direct the vehicle 100 to suitable driving positions along this segment of the roadway 500 based upon the social norms, which are implicitly encoded by the driving position logs that form the basis of the crowd-sourced driving path data 102. In this regard, for example, the crowd-sourced driving path data 102 is particularly beneficial in cases in which relevant information regarding the driving area is not available via map data, sensor data, or any combination thereof.

Figure 6:
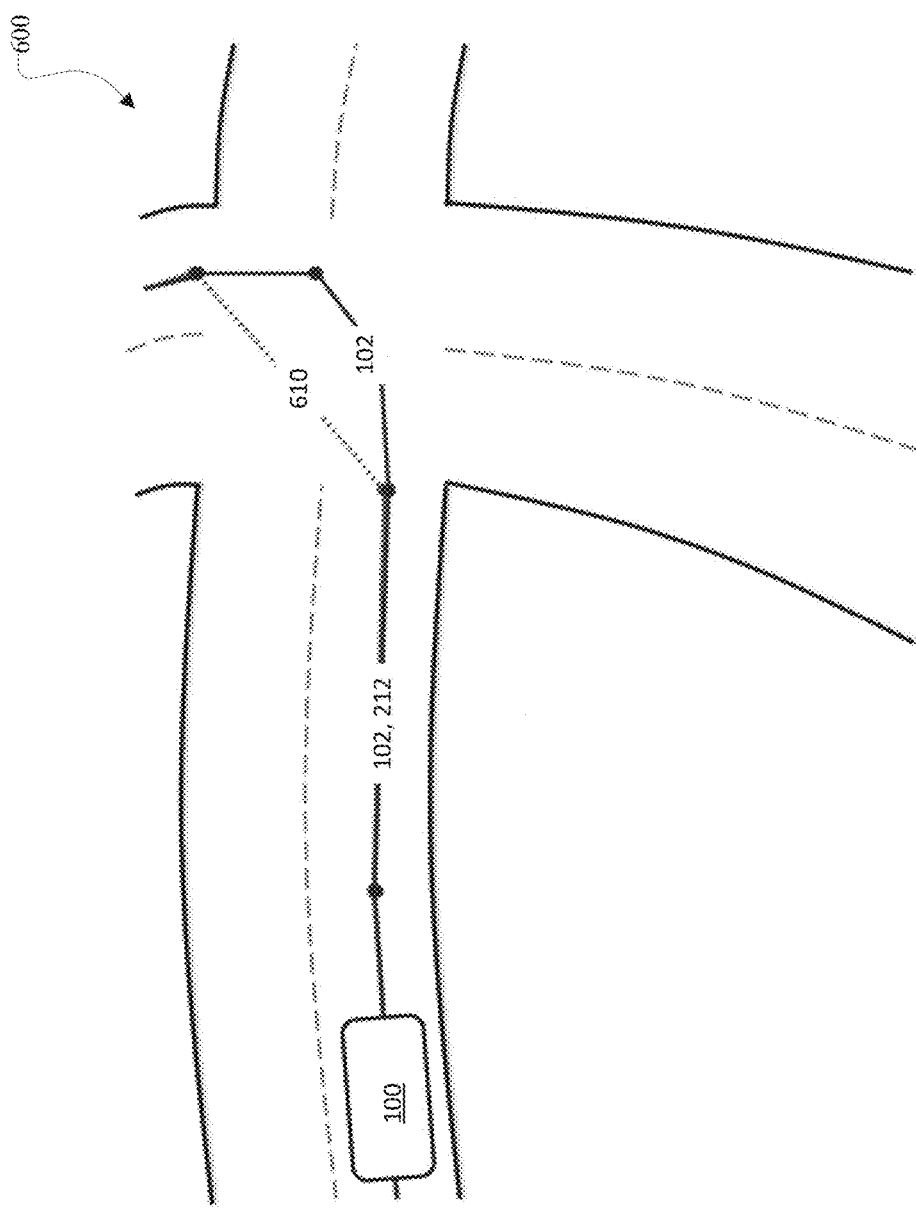
FIG. 6 is a diagram that illustrates another example of the crowd-sourced driving path data according to an example embodiment of this disclosure.

FIG. 6 is a diagram that illustrates another example of the crowd-sourced driving path data 102 according to an example embodiment. More specifically, FIG. 6 illustrates a non-limiting example of the crowd-sourced driving path data 102, taken at an intersection 600. As shown in this example, there may be instances, such as at a portion 610 of the intersection 600, in which there is limited or no information regarding the lane geometry of the roadway. In such instances, with the crowd-sourced driving path data 102, the vehicle 100 is configured to drive in an appropriate manner in accordance with the driving positions and the driving customs, which are typically followed by human-driven vehicles, for example, when approaching and turning at the intersection 600. In this regard, the crowd sourced driving path data 102 is able to provide general guidance, via its driving position data, that enables the vehicle 100 to determine general boundary conditions and lane structures, which may not be provided by the map system 210 and/or which may not be detectable by the perception system 220.

Figure 7:
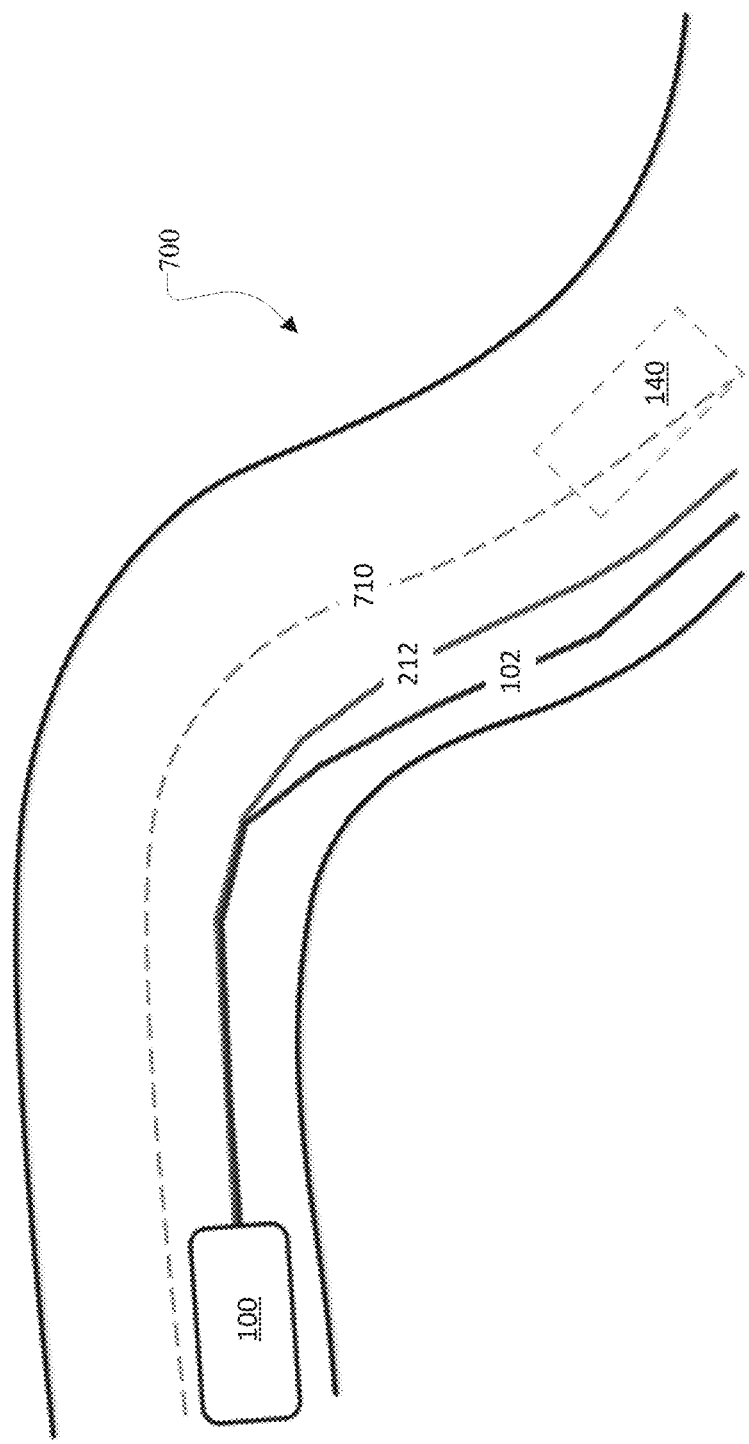
FIG. 7 is a diagram that illustrates yet another example of the crowd-sourced driving path data according to an example embodiment of this disclosure.

FIG. 7 is a diagram that illustrates yet another example of the crowd-sourced driving path data 102 according to an example embodiment. More specifically, FIG. 7 illustrates a non-limiting example of the crowd-sourced driving path data 102, taken at a bi-directional roadway 700, which is divided at dividing line 710 and which has a series of tight turns. As shown in this example, the crowd-sourced driving path data 102 takes into account the general tendency of human drivers to maneuver their vehicles a safe distance away from the centerline 212 in order to avoid oncoming vehicles, such as vehicle 140 that may have a tendency to cross over the dividing line 710 at a certain curvature along the bi-directional roadway 700. In this regard, for this segment of the roadway 700, the crowd-sourced driving path data 102 includes driving position data, as ascertained by human driving experiences and pathways, that are located to the outside of the turn of the roadway 700 to minimize the risk of collision with any oncoming vehicle 140, which may have a tendency to make wide turns along that segment of the roadway 700. As discussed above, there may be instances in which a safe operation of the vehicle 100 involves driving an appropriate distance away from the centerline 212 of the roadway 700. Advantageously, as shown in FIG. 7, the crowd-sourced driving path data 102 is able to provide the vehicle 100 with valuable information based on the driving logs of the human-driven vehicles that have taken into account the potential risks and risk mitigating strategies of a segment of the roadway that may not be ascertainable by the map system 210 and/or the perception system 220.

Figure 8:
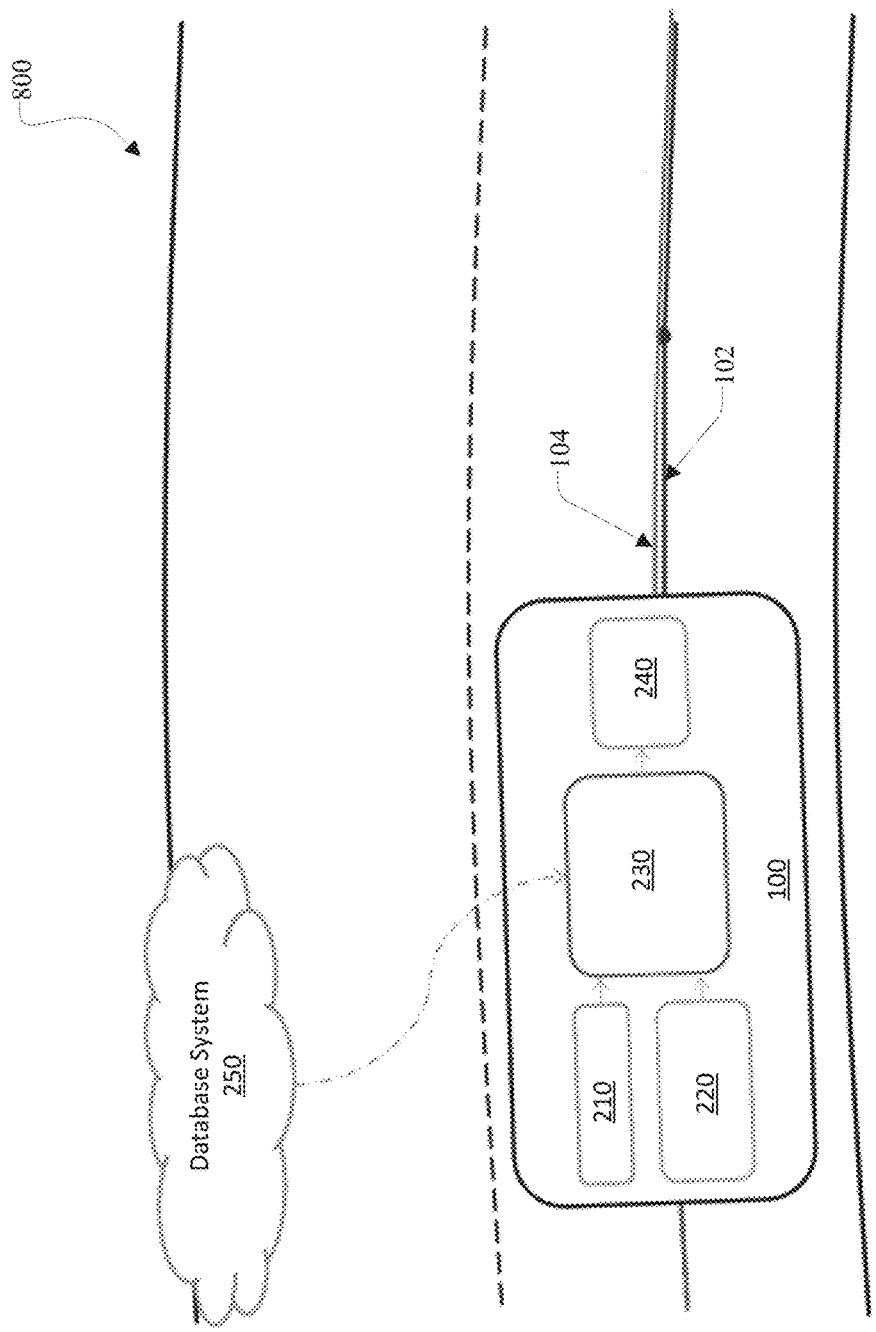
FIG. 8 is a diagram that illustrates an example of the optimized driving path data according to an example embodiment of this disclosure.

FIG. 8 is a diagram that illustrates a non-limiting example of the optimized driving path data 104. In addition, as a frame of reference, FIG. 8 shows a non-limiting example of the crowd-sourced driving path data 102. More specifically, as shown in this example, the optimized driving path data 104 is generated based at least on the crowd-sourced driving path data 102. Accordingly, in some instances, as shown in FIG. 8, the optimized driving path data 104 closely follows the crowd-sourced driving path data 102 on this segment of the roadway 800. For instance, the processing system 200 may optimally generate the optimized driving path data 104 to be close to the crowd-sourced driving path data 102 when the map system 210 and the perception system 220 are unable to provide sufficient information to the optimized driving path generation module 230 at a particular point in time.

Figure 9:
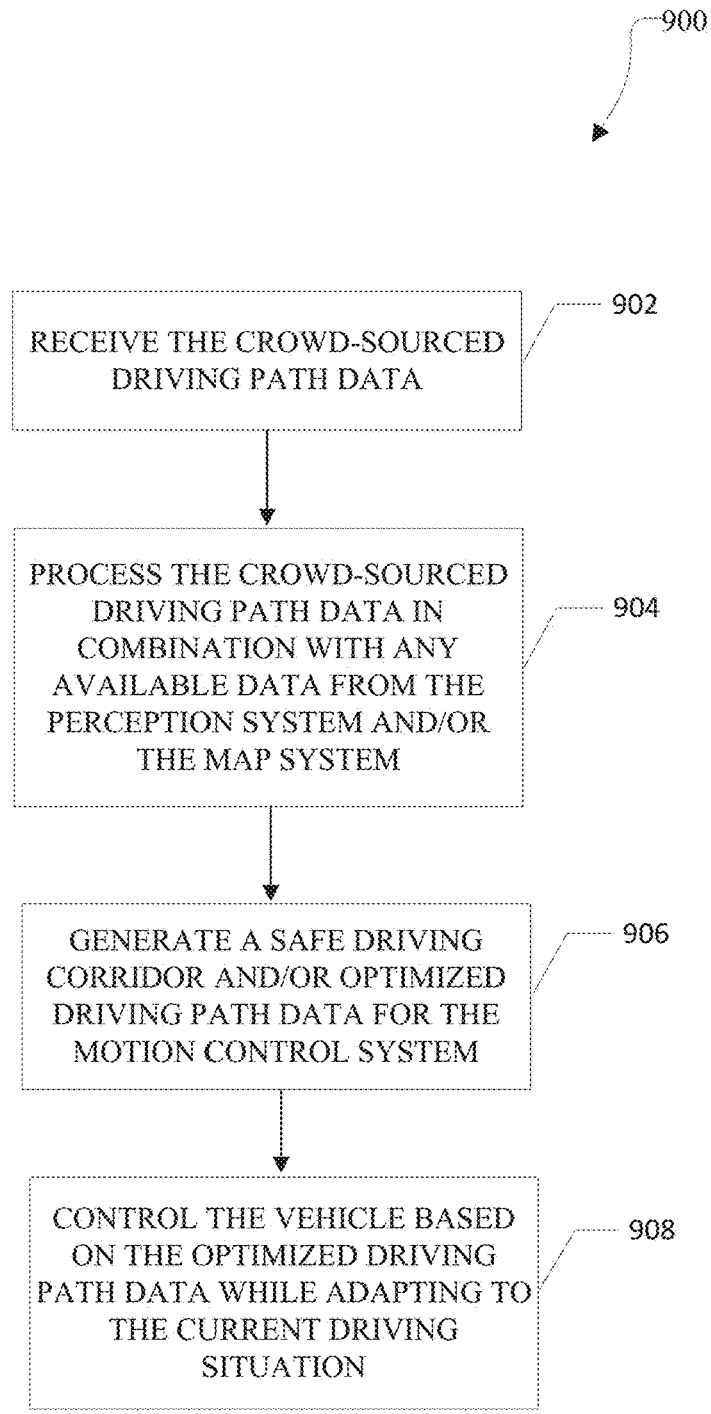
FIG. 9 is a flowchart that illustrates a method performed by the processing system of FIG. 1 according to an example embodiment of this disclosure.

FIG. 9 is a flowchart that illustrates a method 900 performed by the processing system 200 according to an example embodiment. More specifically, at step 902, the processing system 200 receives the crowd-sourced driving path data 102 from the database system 250. For instance, as shown in FIG. 8, the crowd-sourced driving path data 102 is transmitted from the database system 250 to the processing system 200 via wireless communication technology (e.g., radio spectrum technology, cellular technology, WiFi technology, and/or other technologies).

At step 904, the processing system 200 combines the crowd-sourced driving path data 102 with other relevant information. For instance, in an example embodiment, the processing system 200 is configured to combine the crowd-sourced driving path data 102 with any available information, such as that provided by the map system 210, the perception system 220, or a combination of the map system 210 and the perception system 220.

Figure 10:
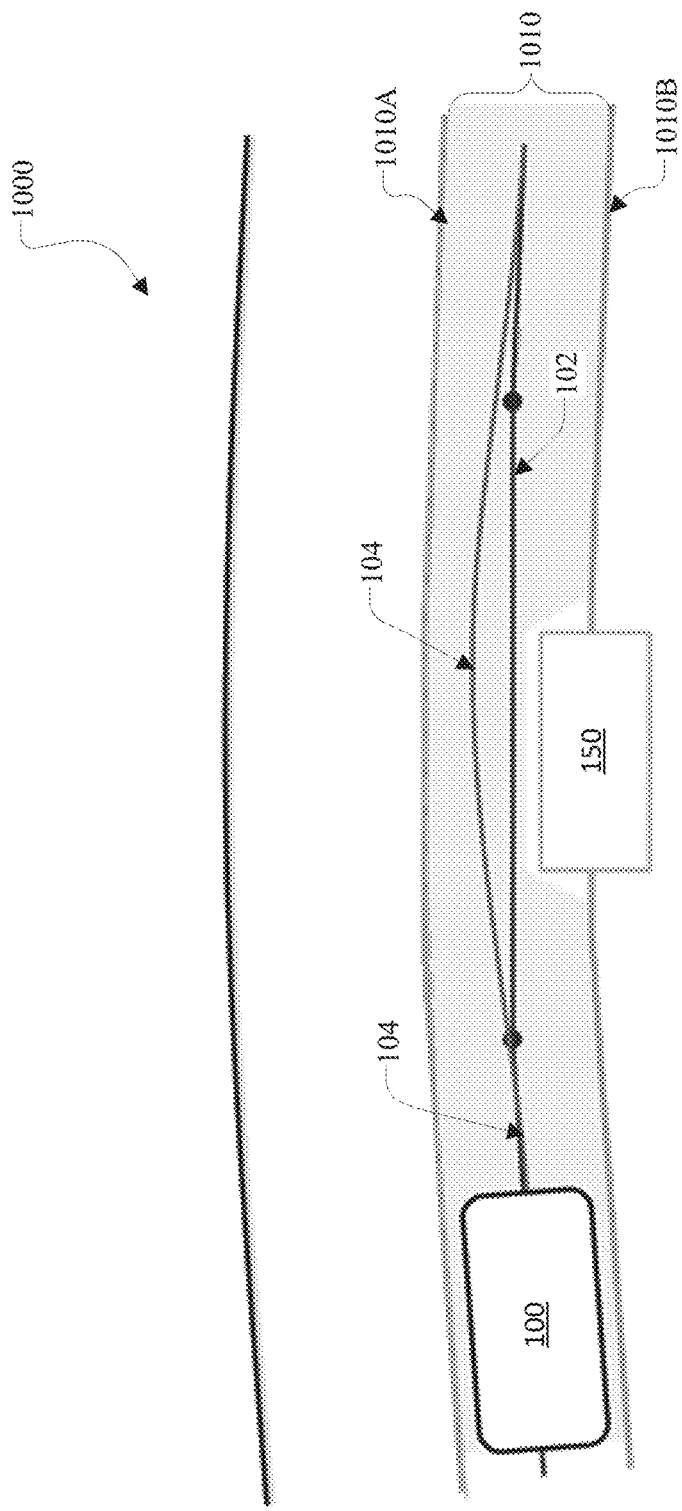
FIG. 10 is a diagram that illustrates an example of the optimized driving path data according to an example embodiment of this disclosure.

At step 906, the processing system 200 generates the driving corridor 1010. In an example embodiment, the processing system 200 is configured to generate the driving corridor 1010 based at least on the map data (e.g., lane geometry information), the sensor data (e.g., lane markings as picked up by camera system), and/or the crowd-sourced driving path data 102 (e.g., driving position data) when such information is available. In an example embodiment, the driving corridor 1010 defines general boundary constraints for controlling the vehicle 100, as shown in FIG. 10. In an example embodiment, the processing system 200 is configured to combine any information pertaining to the driving corridor 1010 from the map system 210 and the perception system 220 to estimate a general structure of the drivable area of the roadway.

Also, at step 906, the processing system 200 generates the optimized driving path data 104. In an example embodiment, the processing system 200, particularly the path generation module 230 is configured to perform numerical calculations and/or mathematical optimization techniques, such as Interior Point methods, Sequential Quadratic Programming, and/or other suitable algorithms, to generate optimized driving path data 104. In an example embodiment, the driving path generation module 230 is configured to generate the optimized driving path data 104, which includes driving position data that is optimized to at least (i) stay close to driving positions of the crowd-sourced driving path data 102, (ii) keep away from the boundaries of the driving corridor 1010, and/or (iii) minimize curvature along its length (e.g., minimize curvature along a projected driving path) while obeying turn radius constraints of the vehicle 100. Moreover, as shown in FIG. 9, the optimized driving path data 104 is performed prior to step 908 to simplify the motion control problem and improve the modularity and robustness of the processing system 200.

At step 908, the processing system 200, particularly the motion control system 240, is configured to receive the optimized driving path data 104 as input. Additionally or alternatively, at step 908, the motion control system 240, is configured to utilize the optimized driving path data 104 as an initial or target path and apply standard trajectory planning and control techniques to navigate the vehicle 100 within the driving corridor 1010 while adapting to the current driving situation. In an example embodiment, the perception system 220 is enabled to contribute information pertaining to the current driving situation of the vehicle 100.

FIG. 10 is a diagram that illustrates a non-limiting example of the optimized driving path data 104 in relation to the driving corridor 1010 for a segment of a roadway 1000. More specifically, in this example, the driving corridor 1010 comprises the area, which is bounded by a first boundary 1010A and a second boundary 1010B. In an example embodiment, the map data, which is at least stored in the computer readable memory of the map system 210, is able to contribute to the generation of the first boundary 1010A and the second boundary 1010B of the driving corridor 1010. Additionally or alternatively, sensor data, which is processed by the perception system 220 (e.g., LIDAR system, camera system, and any other sensor system), is able to contribute to the generation of the first boundary 1010A and the second boundary 1010B of the driving corridor 1010. Additionally or alternatively, the crowd-sourced driving path data 102 is able to contribute to the generation of the first boundary 1010A and the second boundary 1010B of the driving corridor 1010. In an example embodiment, upon being requested, the map data, the sensor data, the crowd-sourced driving path data 102, or any combination thereof is transmitted to the driving path generation module 230, thereby enabling the driving corridor 1010 to be generated.

In FIG. 10, the roadway 1000 includes an obstacle, such as a parked vehicle 150, within the driving corridor 1010. In this case, the obstacle is semi-static in that the parked vehicle 150 is a stationary and time-variant obstruction along the roadway 1000. Also, as shown in FIG. 10, the crowd-sourced driving path data 102 provides a pathway within the driving corridor 1010 that would eventually lead the vehicle 100 to collide with the parked vehicle 150. That is, in this instance, the crowd-sourced driving path data 102 alone does not provide a safe route for the vehicle 100 along this segment of the roadway 1000 due to the parked vehicle 150. Fortunately, as discussed above, the optimized driving path generation module 230 is able to leverage information provided by the database system 250, the map system 210, and the perception system 220. In effect, the optimized driving path generation module 230 is able to generate the optimized driving path data 104, as shown in FIG. 10. In this regard, the motion control system 240 is configured to drive the vehicle 100 in accordance with the optimized driving path data 104 while adapting to the current situation, thereby providing a safe, smooth pathway for the vehicle that circumvents the parked vehicle 150.

As discussed above, the processing system 200 provides the vehicle 100 with a number of advantageous features. In this regard, for example, the processing system 200 is able to provide the driving corridor 1010 and the optimized driving path data 104 in real-time based on up-to-date information provided by various sources. In an example embodiment, the processing system 200 is configured to generate the driving corridor 1010 and the optimized driving path data 104 dynamically based at least on the availability of the various sources for the current driving situation. In an example embodiment, the optimized driving path data 104 is adaptable and scalable in accordance with whatever input is available and received by the driving path generation module 230.

In addition, the processing system 200 is configured to not only control the vehicle 100 based at least on an optimization of these various sources, but is also able to control the vehicle 100 based on at least one of these sources (e.g., crowd-sourced driving path data 102) in the event that the other sources are unable to provide the requisite data at the requisite time. In this regard, for example, by being connected to various sources of up-to-date information, the vehicle 100 is able to be controlled in cases in which there might be missing or incomplete map data and/or in cases in which there is an absence of sensor data (e.g., detectable road markings). For instance, the crowd-sourced driving path data 102 is able to provide the vehicle 100 with general information relating to boundary conditions and lane structures at times when this data is not available from the map system 210 and/or not detectable from the perception system 220.

Also, since crowd-sourced driving path data 102 is provided to the processing system 200, the vehicle 100 is able to drive on a roadway in accordance with local driving customs and social driving norms. In addition, by utilizing crowd-sourced driving path data 102, the processing system 200 is configured to generate optimized driving path data 104 even in instances when no map data is available and/or when no relevant sensor data is available. The vehicle 100 is also configured to minimize risks in situations, which may not be ascertainable from the map system 210 and/or the perception system 220. Accordingly, the motion control system 240, as well as the control of the vehicle 100, is improved with crowd-sourced driving path data 102 compared that without crowd-sourced driving path data 102.

Furthermore, as discussed above, the processing system 200 is configured to generate the optimized driving path data 104 as a preprocessing step to the motion control system 240, thereby reducing the complexity of the motion control problem, as handled by the motion control system 240. Also, in an example embodiment, the processing system 200 is configured to use the optimized driving path data 104 as a basis for the motion control system 240. In this regard, for example, the processing system 200 is configured to adapt dynamically and advantageously to a driving area and/or situation to avoid, for example, semi-static obstacles, such as parked vehicles, construction zones, and/or other similar obstacles that are static but time-dependent and not provided by the map data and/or the sensor data.

In addition, by using at least crowd-sourced driving path data 102, the processing system 200 is configured to leverage human driving patterns of the roadways. Advantageously, the crowd-sourced driving path data 102 is configured to provide the vehicle 100 with the ability to generate optimized driving path data 104 based on local driving behavior and social norms of the roadways. Equipped with information pertaining to human driving strategies of the roadway, the vehicle 100 is able to be controlled and driven in a manner that is able to avoid potential risks, which may not be detectable via the perception system 220 and/or which may not be available via the map system 210 (e.g., FIG. 7). In this regard, the driving performance of the vehicle 100 is enhanced by using the crowd-sourced driving path data 102 to generate the optimized driving path data 104.

That is, the above description is intended to be illustrative, and not restrictive, and provided in the context of a particular application and its requirements. In this regard, for instance, additionally or alternatively to a roadway, the above description can be applied to any suitable pathway, drivable area, or the like. Furthermore, those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method comprising:
receiving, by a processing system with at least one computer processor, crowd-sourced driving path data of a roadway;
receiving, by the processing system, map data of the roadway;
receiving, by the processing system, sensor data pertaining to the roadway;
performing, by the processing system, numerical calculations to generate optimized driving path data, the numerical calculations including at least Interior Point methods or Sequential Quadratic Programming;
generating, by the processing system, the optimized driving path data for the roadway based on the crowd-sourced driving path data, the map data, and the sensor data; and
providing control signals to drive an autonomous or semi-autonomous vehicle based at least on the optimized driving path data.

2. The method of claim 1, wherein the crowd-sourced driving path data is generated based on driving position logs that have been collected from human-driven vehicles.

3. The method of claim 1, wherein the crowd-sourced driving path data is received by the processing system from a cloud-based computing system that is remote from the processing system.

4. The method of claim 1, wherein the optimized driving path data includes driving position data that is optimally calculated to
(a) stay as close as possible to position data of the crowd-sourced driving path data,
(b) maintain space from boundaries of the driving corridor, and
(c) minimize curvature along a length of a projected driving path of the vehicle and obey turn radius constraints of the vehicle.

5. The method of claim 1, further comprising:
generating, by the processing system, a driving corridor for the roadway based on the crowd-sourced driving path data, the map data, and the sensor data,
wherein:
the driving corridor provides boundaries of the roadway, and
the control signals drive the vehicle within the driving corridor in accordance with the optimized driving path data.

6. The method of claim 1, further comprising:
receiving, by the processing system, real-time sensor data from onboard sensors of the vehicle; and
adjusting the control signals that drive the vehicle based on the real-time sensor data.

7. A processing system including at least one computer processor, the processing system being configured to implement a method that comprises:
receiving crowd-sourced driving path data of a roadway;
receiving map data of the roadway;
receiving sensor data pertaining to the roadway;
performing numerical calculations to generate optimized driving path data, the numerical calculations including at least Interior Point methods or Sequential Quadratic Programming;
generating the optimized driving path data for the roadway based on the crowd-sourced driving path data, the map data, and the sensor data; and
providing control signals to drive an autonomous or semi-autonomous vehicle based at least on the optimized driving path data.

8. The processing system of claim 7, wherein the crowd-sourced driving path data is generated based on driving position logs that have been collected from human-driven vehicles.

9. The processing system of claim 7, wherein the crowd-sourced driving path data is received by the processing system from a cloud-based computing system that is remote from the processing system.

10. The processing system of claim 7, wherein the optimized driving path data includes driving position data that is optimally calculated to
(a) stay as close as possible to position data of the crowd-sourced driving path data,
(b) maintain space from boundaries of the driving corridor, and (c) minimize curvature along a length of a projected driving path of the vehicle and obey turn radius constraints of the vehicle.

11. The processing system of claim 7, further comprising:
generating, by the processing system, a driving corridor for the roadway based on the crowd-sourced driving path data, the map data, and the sensor data,
wherein:
the driving corridor provides boundaries of the roadway, and
the control signals drive the vehicle within the driving corridor in accordance with the optimized driving path data.

12. The processing system of claim 7, further comprising:
receiving, by the processing system, real-time sensor data from onboard sensors of the vehicle; and
adjusting the control signals that drive the vehicle based on the real-time sensor data.

13. An autonomous or semi-autonomous vehicle including a processing system with at least one computer processor configured to implement a method that comprises:
receiving crowd-sourced driving path data of a roadway;
receiving map data of the roadway;
receiving sensor data pertaining to the roadway;
performing numerical calculations to generate optimized driving path data, the numerical calculations including at least Interior Point methods or Sequential Quadratic Programming;
generating the optimized driving path data for the roadway based on the crowd-sourced driving path data, the map data, and the sensor data; and
providing control signals to drive an autonomous or semi-autonomous vehicle based at least on the optimized driving path data.

14. The vehicle of claim 13, wherein the crowd-sourced driving path data is generated based on driving position logs that have been collected from human-driven vehicles.

15. The vehicle of claim 13, wherein the crowd-sourced driving path data is received by the processing system from a cloud-based computing system that is remote from the processing system.

16. The vehicle of claim 13, wherein the optimized driving path data includes driving position data that is optimally calculated to
(a) stay as close as possible to position data of the crowd-sourced driving path data,
(b) maintain space from boundaries of the driving corridor, and
(c) minimize curvature along a length of a projected driving path of the vehicle and obey turn radius constraints of the vehicle.

17. The vehicle of claim 13, further comprising:
generating, by the processing system, a driving corridor for the roadway based on the crowd-sourced driving path data, the map data, and the sensor data,
wherein:
the driving corridor provides boundaries of the roadway, and
the control signals drive the vehicle within the driving corridor in accordance with the optimized driving path data.

18. The vehicle of claim 13, further comprising:
receiving, by the processing system, real-time sensor data from onboard sensors of the vehicle; and
adjusting the control signals that drive the vehicle based on the real-time sensor data.

* * * * *